(12) United States Patent
Lee et al.

(10) Patent No.: US 11,518,264 B2
(45) Date of Patent: Dec. 6, 2022

(54) MONITORING AND CONTROLLING VEHICLE CHARGING FACILITY INFORMATION AND METHOD OF CONTROLLING THE SAME

(71) Applicants: HYUNDAI MOTOR COMPANY, Seoul (KR); KIA MOTORS CORPORATION, Seoul (KR)

(72) Inventors: Myoungjun Lee, Seoul (KR); Hyunwoo Shin, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 371 days.

(21) Appl. No.: 16/816,739

(22) Filed: Mar. 12, 2020

(65) Prior Publication Data
US 2021/0122257 A1  Apr. 29, 2021

(30) Foreign Application Priority Data

Oct. 23, 2019 (KR) .......... 10-2019-0131905

(51) Int. Cl.
*B60L 53/62* (2019.01)

(52) U.S. Cl.
CPC ......... *B60L 53/62* (2019.02); *B60L 2240/545* (2013.01); *B60L 2240/547* (2013.01); *B60L 2240/70* (2013.01)

(58) Field of Classification Search
CPC .............................. B60L 53/62; B60L 2240/70
USPC ........................................................ 700/297
See application file for complete search history.

(56) References Cited

U.S. PATENT DOCUMENTS

| | | | |
|---|---|---|---|
| 2015/0298565 A1* | 10/2015 | Iwamura ............ | G06Q 10/0631 701/22 |
| 2018/0202825 A1* | 7/2018 | You ........................ | B60L 53/305 |
| 2019/0025068 A1* | 1/2019 | Yoshino ............. | G06Q 30/0631 |
| 2019/0232813 A1* | 8/2019 | Kusumi ................. | B60L 53/67 |
| 2020/0016993 A1* | 1/2020 | Imai ................. | G08G 1/096866 |
| 2020/0207232 A1* | 7/2020 | Niwa ....................... | B60L 53/62 |

(Continued)

FOREIGN PATENT DOCUMENTS

| | | |
|---|---|---|
| KR | 10-1086449 B1 | 11/2011 |
| KR | 2013-0089711 A | 8/2013 |
| KR | 10-1449170 B1 | 10/2014 |

(Continued)

*Primary Examiner* — Md Azad
(74) *Attorney, Agent, or Firm* — McDonnell Boehnen Hulbert & Berghoff LLP

(57) ABSTRACT

The disclosure relates to a vehicle and a method of controlling the vehicle. It is possible to determine whether the charger is normal or abnormal for each charger of the charging station, to guide the path to the charging station based on determination information, and to share the determination information with other users for the convenience of the users. The method of controlling the vehicle includes obtaining, by a receiver, information of a charger, information of a charging vehicle, and information of charging history of the charger and the charging vehicle; calculating, by a calculator, an expected output and an actual output of the charger based on the obtained information; and classifying, by a controller, the charger as an abnormal charger when the actual output of the charger is smaller than the expected output of the charger.

14 Claims, 6 Drawing Sheets

(56) References Cited

U.S. PATENT DOCUMENTS

2020/0376979 A1* 12/2020 Liang .................... B60L 3/12

FOREIGN PATENT DOCUMENTS

| KR | 10-1691559 B1 | 12/2016 |
| KR | 10-1907656 B1 | 10/2018 |
| KR | 2019-0043764 A | 4/2019 |

* cited by examiner

FIG. 3

| CURRENT TEMPERATURE | -35℃ ~ -10.1℃ | | -10℃ ~ 4.9℃ | | 5℃ ~ 9.9℃ | | 10℃ ~ 14.9℃ | | 15℃ ~ 19.9℃ | |
|---|---|---|---|---|---|---|---|---|---|---|
| Step | Cut-off | CHARGING CURRENT | Cut-off | CHARGING CURRENT | Cut-off | CHARGING CURRENT | Cut-off | CHARGING CURRENT | Cut-off | CHARGING CURRENT |
| 1 | 4.01 | MAP | 4.08 | MAP | 3.883 | 108 | 3.883 | 108 | 3.908 | 144 |
| 2 | 4.01 | MAP | 4.08 | MAP | 10sec | 72 | 10sec | 108 | 10sec | 108 |
| 3 | 4.01 | MAP | 4.08 | MAP | 3.885 | 72 | 3.885 | 108 | 3.908 | 108 |
| 4 | 4.01 | MAP | 4.08 | MAP | 3.914 | 72 | 3.914 | 108 | 3.993 | 108 |
| 5 | 4.01 | MAP | 4.08 | MAP | 10sec | 60 | 10sec | 90 | 10sec | 90 |
| 6 | 4.01 | MAP | 4.08 | MAP | 3.908 | 60 | 3.908 | 90 | 3.981 | 90 |
| 7 | 4.01 | MAP | 4.08 | MAP | 4.100 | 60 | 4.100 | 60 | 4.100 | 60 |

| CURRENT TEMPERATURE | 20℃ ~ 24.9℃ | | 25℃ ~ 34.9℃ | | 35℃ ~ 44.9℃ | | 45℃ ~ 49.9℃ | | 50℃ ~ 60℃ | |
|---|---|---|---|---|---|---|---|---|---|---|
| Step | Cut-off | CHARGING CURRENT | Cut-off | CHARGING CURRENT | Cut-off | CHARGING CURRENT | Cut-off | CHARGING CURRENT | Cut-off | CHARGING CURRENT |
| 1 | 3.908 | 144 | 3.888 | 200 | 3.888 | 180 | 3.888 | 125 | 4.16 | MAP |
| 2 | 10sec | 108 | 10sec | 180 | 10sec | 144 | 10sec | 125 | 4.16 | MAP |
| 3 | 3.908 | 108 | 3.888 | 180 | 3.888 | 144 | 3.888 | 125 | 4.16 | MAP |
| 4 | 4.035 | 108 | 4.037 | 144 | 4.037 | 144 | 4.037 | 125 | 4.16 | MAP |
| 5 | 10sec | 90 | 10sec | 90 | 10sec | 90 | 10sec | 90 | 4.16 | MAP |
| 6 | 4.004 | 90 | 4.037 | 90 | 4.037 | 90 | 4.037 | 90 | 4.16 | MAP |
| 7 | 4.100 | 60 | 4.151 | 60 | 4.151 | 60 | 4.151 | 60 | 4.16 | MAP |

MONITORING AND CONTROLLING VEHICLE CHARGING FACILITY INFORMATION AND METHOD OF CONTROLLING THE SAME

CROSS REFERENCE TO RELATED APPLICATIONS

This application is based on and claims priority under 35 U.S.C. § 119 to Korean Patent Application No. 10-2019-0131905, filed on Oct. 23, 2019 in the Korean Intellectual Property Office, the disclosure of which is incorporated by reference in its entirety.

TECHNICAL FIELD

The disclosure relates to a vehicle, and more particularly, to an eco-friendly vehicle configured to charge a battery by receiving power from a charger.

BACKGROUND

An eco-friendly vehicle receives power from a separate charger to charge a battery and uses the battery's charging power as driving energy.

In general, since a broken charger does not perform any charging function, it is easily identified and a fault indication leads to the broken charger not being used. However, an abnormal charger that can be charged but does not generate a normal output due to a functional failure is not operated separately from a normal charger because the abnormal charger is charged to some degree even if the abnormal charger does not reach a rated output. In the case of the abnormal charger, since the output for charging is smaller than the rated output, the abnormal charger takes longer than the normal charger to charge a required charge amount. This results in an inconvenience for users who expect the charger's rated output to wait longer than expected when using the abnormal charger.

SUMMARY

Therefore, it is an aspect of the disclosure to provide a vehicle for determining whether a charger is normal or abnormal for each charger of a charging station, guiding a path to the charging station based on determination information, and sharing the determination information with other users for the convenience of users.

Additional aspects of the disclosure will be set forth in part in the description which follows and, in part, will be obvious from the description, or may be learned by practice of the disclosure.

In accordance with an aspect of the disclosure, a method of controlling a vehicle includes obtaining, by a receiver, information of a charger, information of a charging vehicle, and information of a charging history of the charger and the charging vehicle; calculating, by a calculator, an expected output and an actual output of the charger based on the obtained information; and classifying, by a controller, the charger as an abnormal charger when the actual output of the charger is smaller than the expected output of the charger.

The expected output of the charger is determined based on a value indicating a relationship between a battery cell voltage of the charging vehicle and charging current for each battery temperature, an expected charging time through the charger, and a rated charging capacity of the charger. The actual output of the charger is determined based on at least one of an actual charging current applied to the vehicle, the actual charging time in the vehicle, an actual charging capacity of the charger.

The method may further include identifying whether an abnormal charging is the abnormal charging due to a vehicle problem, classifying chargers that are abnormally charged due to the vehicle problem as normal chargers, and excluding chargers classified as normal chargers from a list of chargers classified as abnormal chargers.

The identifying of whether the abnormal charging is the abnormal charging due to the vehicle problem may include determining that the cause of the abnormal charging of the charger is due to a problem of the charging vehicle when power input from the charging vehicle is smaller than the power output from the charger.

The identifying of whether the abnormal charging is the abnormal charging due to the vehicle problem may include determining that the cause of the abnormal charging of the charger is due to a problem of the charging vehicle when a current command generated based on information of the charger and the charging vehicle does not correspond to a content of the information.

The identifying of whether the abnormal charging is the abnormal charging due to the vehicle problem may include determining that the cause of the abnormal charging of the charger is due to a problem of the charging vehicle when a charging time is prolonged due to an abnormal fastening of a charging cable in the charging vehicle.

The identifying of whether the abnormal charging is the abnormal charging due to the vehicle problem may include determining that the cause of abnormal charging of the charger is due to a problem of the charging vehicle when an amount of charging current and a charging time are abnormal due to a battery failure of the charging vehicle.

The method may further include displaying information of the abnormal charger on a map of a display, and guiding a path to a position of the charger selected by a user.

The method may further include transmitting information of the abnormal charger to a remote server for sharing.

In accordance with another aspect of the disclosure, a vehicle includes a receiver configured to receive information of a charger, information of a charging vehicle, and information of charging history of the charger and the charging vehicle, a calculator configured to calculate an expected output and an actual output of the charger based on the obtained information, and a controller configured to classify the charger as an abnormal charger when the actual output of the charger is smaller than the expected output of the charger.

The calculator may be configured to determine the expected output of the charger based on a value indicating a relationship between a battery cell voltage of the charging vehicle and charging current for each battery temperature, an expected charging time through the charger, and a rated charging capacity of the charger, and to determine the actual output of the charger based on at least one of an actual charging current applied to the vehicle, the actual charging time in the vehicle, an actual charging capacity of the charger.

The controller may be configured to identify whether an abnormal charging is the abnormal charging due to a vehicle problem, to classify chargers that are abnormally charged due to the vehicle problem as normal chargers, and to exclude chargers classified as normal chargers from a list of chargers classified as abnormal chargers.

The controller may be configured to determine that the cause of the abnormal charging of the charger is due to a problem of the charging vehicle when power input from the charging vehicle is smaller than the power output from the charger.

The controller may be configured to determine that the cause of the abnormal charging of the charger is due to a problem of the charging vehicle when a current command generated based on information of the charger and the charging vehicle does not correspond to a content of the information.

The controller may be configured to determine that the cause of the abnormal charging of the charger is due to a problem of the charging vehicle when a charging time is prolonged due to an abnormal fastening of a charging cable in the charging vehicle.

The controller may be configured to determine that the cause of abnormal charging of the charger is due to a problem of the charging vehicle when an amount of charging current and a charging time are abnormal due to a battery failure of the charging vehicle.

The vehicle may further include a display configured to display information of the abnormal charger on a map of a display, and to guide a path to a position of the charger selected by a user.

The vehicle may further include a transmitter configured to transmit information of the abnormal charger to a remote server for sharing.

BRIEF DESCRIPTION OF THE FIGURES

These and/or other aspects of the disclosure will become apparent and more readily appreciated from the following description of the embodiments, taken in conjunction with the accompanying drawings of which:

FIG. 3 is a view illustrating an example of a table illustrating a relationship between a charging current for each battery cell voltage/battery temperature of a charging vehicle.

DETAILED DESCRIPTION

Figure 1:
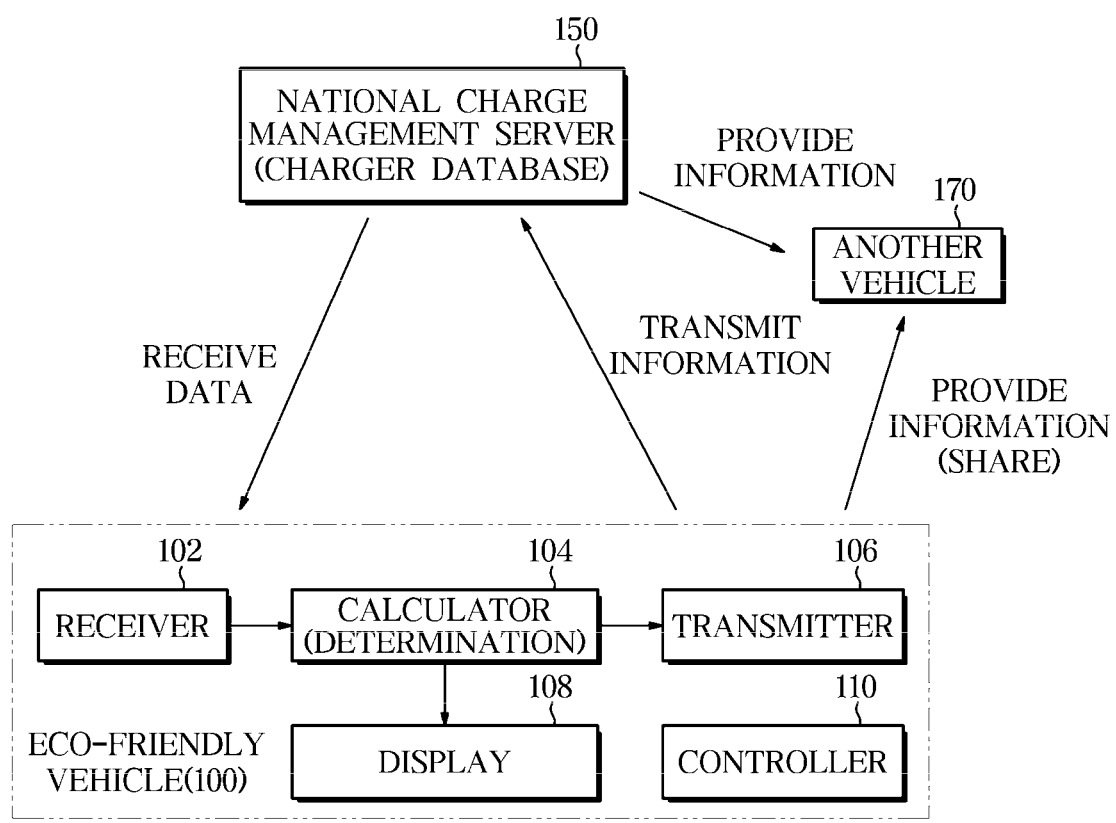
FIG. 1 is a view illustrating a configuration for determining a charging station of an eco-friendly vehicle according to exemplary embodiments of the disclosure.

FIG. 1 is a view illustrating a configuration for determining a charging station of an eco-friendly vehicle according to exemplary embodiments of the disclosure.

Referring to FIG. 1, an eco-friendly vehicle 100 may include a receiver 102, a calculator 104, a transmitter 106, and a display 108. The eco-friendly vehicle 100 may communicate with a national charge management server 150 to receive data necessary for determining whether a charger is normal or abnormal and feedback charger determination result to the national charge management server 150. The determination result of the charger in the eco-friendly vehicle 100 may be directly transmitted from the eco-friendly vehicle 100 to another vehicle 170 or provided to another vehicle 170 from the national charge management server 150.

In an embodiment of the disclosure, a 'normal charger', an 'abnormal charger', and a 'broken charger' may be defined as follows. First, the normal charger may refer to a charger in which an output for charging is performed according to an expected output (e.g., rated output) of the corresponding charger by operating normally during charging. The abnormal charger may refer to a charger that chargers a vehicle but does not output the expected output (e.g., rated output) of the corresponding charger and generates an output smaller than the rated output. The broken charger may refer to a charger that fails and cannot perform any charging function at all (or almost).

In general, since the broken charger does not perform any charging function, it is easily identified and the fault indication leads to the broken charger not being used. However, the abnormal charger that can be charged but does not generate a normal output due to a functional failure is not operated separately from the normal charger because the abnormal charger is charged to some degree even if the abnormal charger does not reach the rated output. In the case of the abnormal charger, since the output for charging is smaller than the rated output, the abnormal charger takes longer than the normal charger to charge a required charge amount. This results in inconvenience for users who expect the charger's rated output to wait longer than expected when using the abnormal charger. In the embodiment of the disclosure, it is intended to facilitate the users by determining whether the charger is normal or abnormal for each charger of a charging station, guiding a path to the charging station based on determination information, and sharing the determination information with other users for the convenience of users.

The national charge management server 150 may be a server for constructing and operating information of electric charging stations nationwide as a database. In other words, the national charge management server 150 may construct the database of a position of each charging station, a current state of chargers, a usage history and specification of each charger, and information of the vehicles using the charger, and may provide the necessary information in response to the needs of eco-friendly vehicle users. Accumulation of information of the national charge management server 150 is performed for registered charging stations and vehicles registered with the national charge management server 150.

The receiver 102 of the eco-friendly vehicle 100 may receive charger information for each charging station from the national charge management server 150. The charger information for each charging station received through the receiver 102 may include unique identification information and specification of the corresponding charger, a previous charging history, and information of a previous charging vehicle.

The calculator 104 of the eco-friendly vehicle 100 may calculate the charger information for each charging station received through the receiver 102 according to a predetermined determination reference to determine whether each charger is normal or abnormal. The determination of whether the charger is normal or abnormal will be described in detail with reference to FIGS. 2 and 3 to be described below.

The transmitter 106 of the eco-friendly vehicle 100 may feedback the determination result of the calculator 104 to the national charge management server 150 for the purpose of storing and updating information, and may provide another vehicle 170 for the purpose of sharing. The information provided to the national charge management server 150 may be provided to another vehicle 170 from the national charge management server 150.

The display 108 of the eco-friendly vehicle 100 may display the determination result of the charger for each charging station. For example, each charging station may be displayed on a map of a navigation screen, and each charging station may be distinguished and displayed according to the presence or ratio of the normal charger, the abnormal charger, and the broken charger among the chargers provided in each charging station. This will be described in detail with reference to FIG. 4 to be described below.

The controller 110 may control the overall operation of the receiver 102, the calculator 104, the transmitter 106, and the display 108 so as to collect, analyze, and display information for each charging station.

Figure 2:
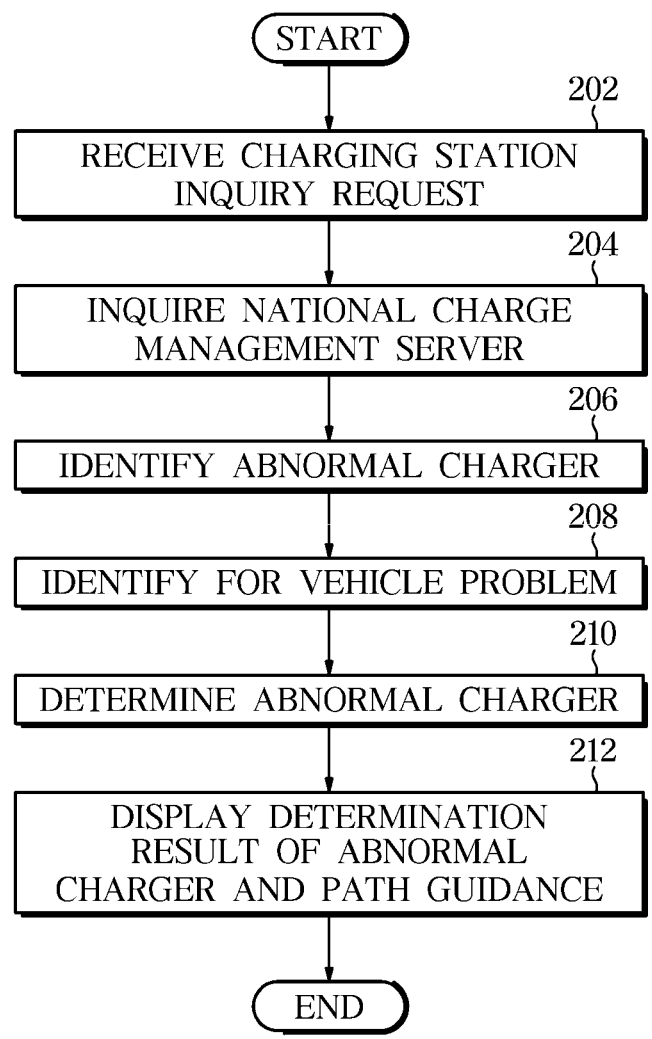
FIG. 2 is a view illustrating a charger determination method of an eco-friendly vehicle according to exemplary embodiments of the disclosure.

FIG. 2 is a view illustrating a charger determination method of an eco-friendly vehicle according to exemplary embodiments of the disclosure.

As illustrated in FIG. 2, the controller 110 may receive a charging station inquiry request input through a user interface of the eco-friendly vehicle 100 (202). The charging station inquiry request may be generated through a user interface operation of a user (driver). For example, the charging station inquiry request may be generated by selecting a charging station inquiry menu of the user interface displayed on a touch screen provided in the eco-friendly vehicle 100. Alternatively, the charging station inquiry request may be generated by operating a button separately provided for the charging station inquiry request. Alternatively, the charging station inquiry request may be generated through a voice or gesture that is previously promised.

In response to receiving the charging station inquiry request, the controller 110 may inquire charging station information from the national charge management server 150 which is a charger management server (204). That is, the controller 110 may inquire the position of each charging station, the current state of chargers, the usage history and specification of each charger, and information of the vehicles using the charger from the national charge management server 150.

In this case, the information obtained by the eco-friendly vehicle 100 from the national charge management server 150 is as follows. In the information below, 'charging vehicle' may refer to the vehicle that has been charged by the corresponding charger. That is, the information obtained by the eco-friendly vehicle 100 from the national charge management server 150 may include information for confirming the expected output (rated output) of each charger and information of the charging history (charging result) of the charging vehicles that actually charged by the corresponding charger.

1) A charging time (hr)
2) A battery cell temperature (° C.)
3) A battery cell voltage (V)
4) A charging energy amount (kWh)
5) A rated capacity of charger (kW)
6) A supply current of charger (A)
7) charging current of charging vehicle (A)
8) current command of charging vehicle (A)

The charging time (hr) may be a time taken for an actual charging of each charger.

The battery cell temperature (° C.) may be a temperature of a battery cell of the charging vehicle during charging.

The battery cell voltage (V) may be a voltage of the battery cell of the charging vehicle during charging.

The charging energy amount (kWh) may be an amount of energy per unit time actually charged to the battery of the charging vehicle during charging.

The rated capacity of charger (kW) may be a rated charging energy amount in the specification published by a manufacturer of the charger.

The supply current of charger (A) may be a rated charging current in the specification published by the manufacturer of the charger.

The charging current of the charging vehicle (A) may be an amount of current actually charged in the battery of the charging vehicle during charging.

The current command of the charging vehicle (A) may be an amount of current required by the charger in the charging vehicle. When charging, the charging vehicle may set a cut-off voltage of the battery according to the temperature of the battery. A magnitude of the current command (i.e., a magnitude of charging current required by the charger in the charging vehicle) is determined by the temperature of the battery and the cut-off voltage.

The controller 110 may identify the abnormal charger through analysis (calculation) of information (the position of each charging station, the current state of chargers, the usage history and specification of each charger, and information of the vehicles using the charger) obtained from the national charge management server 150 (206). That is, the controller 110 may compare the expected output (rated output) of each charger with the actual charging result actually charged by other vehicles in the corresponding charger and identify whether the corresponding charger is normal or abnormal from the difference.

To this end, the controller 110 may analyze (calculate) the information obtained in operation 204 and identify whether at least one of the following conditions A1 to A3 is satisfied. When at least one of the following three conditions is satisfied, the controller 110 may temporarily determine that the corresponding charger is the abnormal charger. A final determination on whether or not the abnormal charger is made after identifying whether the problem of the vehicle to be described later.

(Condition A1) When there is an error of a predetermined magnitude or more by comparing a value of a table illustrating a relationship between the charging current for each battery cell voltage/battery temperature of the charging vehicle and the actual charging current of the charging vehicle (Condition A2) When an actual charging time is longer than a predetermined time than an expected charging time (Condition A3) When an actual charging capacity is smaller than a rated charging capacity of the charger In order to determine whether the condition A1 is established, the controller 110 may use information of a charging temperature (° C.), a cell voltage (V), the supply current of charger (A), the charging current of the charging vehicle (A), and the current command of the charging vehicle (A). The charging the battery of the charging vehicle is affected by the battery cell voltage. The voltage of the battery cell is affected by the temperature of the battery. The voltage of the battery cell also depends on the energy usage of the battery. In the above, the value of the current command of the charging vehicle is determined based on the table indicating the relationship between the battery cell voltage of the charging vehicle and the charging current for each battery temperature. When the charger is normal, the actual output current of the charger must match the current command of the charging vehicle or have a magnitude within an allowable error range. Therefore, the controller 110 may compare the current command of the charging vehicle with the magnitude of the current actually output from the charger. When the actual output current of the charger does not satisfy the current command of the eco-friendly vehicle 100 (when an error is outside allowable range), the controller 110 may temporarily determine the charger as the abnormal charger. For example, when the allowable error range is ±10 A, when the actual output current of the charger is 50 A despite the current command is 90 A, since the error greatly exceeds the allowable error range, the controller 110 may temporarily determine the charger as the abnormal charger.

FIG. 3 is a view illustrating an example of a table illustrating a relationship between a charging current for each battery cell voltage/battery temperature of a charging vehicle.

The controller 110 of the eco-friendly vehicle 100 may generate the current command with reference to the table as illustrated in FIG. 3 and transmit the current command to the charger so that the charging current corresponding to the current command is output from the charger.

Returning to FIG. 2, the controller 110 may use information of the charging time (hr) and the charging energy amount (kWh) to determine whether the condition A2 is established. That is, the controller 110 may calculate a charging completion time by integrating energy kWh using the current (A) and the voltage (V) until the energy corresponding to the target state of charge (SOC) of the battery is reached. When the actual charging completion time is abnormally longer than the calculated charging completion estimated time (longer than a preset error), the controller 110 may temporarily determine the charger as the abnormal charger.

In addition, the controller 110 may use information of the rated charging capacity (kW) of the charger to determine whether the condition A3 is established. Each of the chargers installed in each charging station has the rated charging capacity that can provide charging (for example, 50 kW, 100 kW, etc.). Actual efficiencies are present in all machines, and the actual efficiencies do not completely output the rated charging capacity (50 kW, 100 kW). In normal cases, however, the error of the actual charging capacity to the rated charging capacity should be within the allowable range. The controller 110 may inquiry the charging history of the charger, compare the rated charging capacity and the actual charging capacity for each charger, and temporarily determine the charger as the abnormal charger when the error is out of the allowable error range. For the charger with the rated charging capacity of 50 kW and the allowable error range of ±5 kW, when the actual charging capacity is 25 kW, the actual charging capacity of the charger is 25 kW less than the rated charging capacity and the error is far beyond the allowable error range of ±5 kW. Therefore, the charger may be temporarily determined to be the abnormal charger.

When the identification of the abnormal charger is completed by comparing the analysis result of the information obtained from the national charge management server 150 and the actual charging result, the controller 110 may identify whether or not the problem of the vehicle occurs in order to whether the abnormal charging of the identified chargers is not caused by a problem of the charging vehicle but not a problem of the charger (208). That is, even though the cause of the abnormal charging is actually due to the problem of the charging vehicle, it may be incorrectly determined that this is due to the problem of the charger. Therefore, it is desirable to identify whether the cause of the abnormal charging of the charger is due to the problem of the charger by identifying whether there is the problem in the charging vehicle, the controller 110 may classify the charger as the normal charger.

To this end, when the controller 110 satisfies at least one of the following conditions B1 to B4, the controller 110 may determine that the cause of the abnormal charging is in the charging vehicle itself, not the charger, and may classify the charger as the normal charger instead of the abnormal charger.

(Condition B1) the charger outputs rated capacity, but the charging vehicle does not accept as much power as the rated capacity of charger due to a software or hardware problem (Condition B2) the charging vehicle fails to generate correct current command due to data reading error (Condition B3) a long charging time due to abnormal fastening of a charging cable in the charging vehicle (Condition B4) the charging current amount and the charging time are abnormal due to the battery of the charging vehicle.

In the condition B1, the charger outputs the rated capacity, but when the charging vehicle does not accept the power as the rated capacity of charger due to the software or hardware problem, the charging time will be longer than expected. In this case, since the long charging time is caused by the charging vehicle, that is, the software or hardware problem of the charging vehicle, the controller 110 may classify the charger as the normal charger.

In the condition B2, when a wrong value is detected due to a malfunction of a sensor in the charging vehicle, this may generate an incorrect current command. Therefore, when the incorrect current command occurs due to the malfunction of the sensor in the charging vehicle, the controller 110 may classify the charger as the normal charger. For example, when there is a problem with a temperature sensor of the charging vehicle, it is easy to identify that there is a problem with the temperature measurement of the charging vehicle by comparing a temperature measurement value of the charger with a temperature measurement value of the charging vehicle, temperature data of the national charge management server 150. When it is identified that there is the problem in the temperature measurement value of the charging vehicle, the controller 110 may recognize that the current command is not the correct value and classify the charger as the normal charger.

In the condition B3, when a connector of the cable connecting a charging terminal of the charging vehicle is not properly connected to the charging terminal of the charging vehicle, the charger will attempt to lock the connector and then give up and stop the charging. In this case, since the power cannot be transmitted from the charger to the charging vehicle, the controller 110 may incorrectly determine the charger as the abnormal charger. Therefore, when the number of attempts to lock the connector at the charging terminal is more than normal, the controller 110 may recognize the abnormal charging due to a connector connection problem in the charging vehicle and classify the charger as the normal charger.

In the condition B4, a battery management system (BMS) of the charging vehicle may monitor the voltage between battery cells and when the voltage of a particular battery cell used to generate a current reference is significantly different (particularly high or particularly low) from that of other battery cells, the controller 110 may determine that the abnormal charging in this case is caused by the battery of the charging vehicle. It is determined that the problem is caused, and the controller 110 may classify the charger as the normal charger.

When the identification of the abnormal charger (206) and whether the problem in the charging vehicle is completed (208), the controller 110 may determine the abnormal charger by combining the identification results (210). That is, the controller 110 may finally determine among the chargers identified as the abnormal charger in the abnormal charger identification result (206), the chargers except for the case where the abnormal charging is made due to the problem of the charging vehicle as the abnormal charger in which the abnormal charging is actually performed.

Also, the controller 110 may display a final determination result of the abnormal charger through the display 108 (212).

Figure 4:
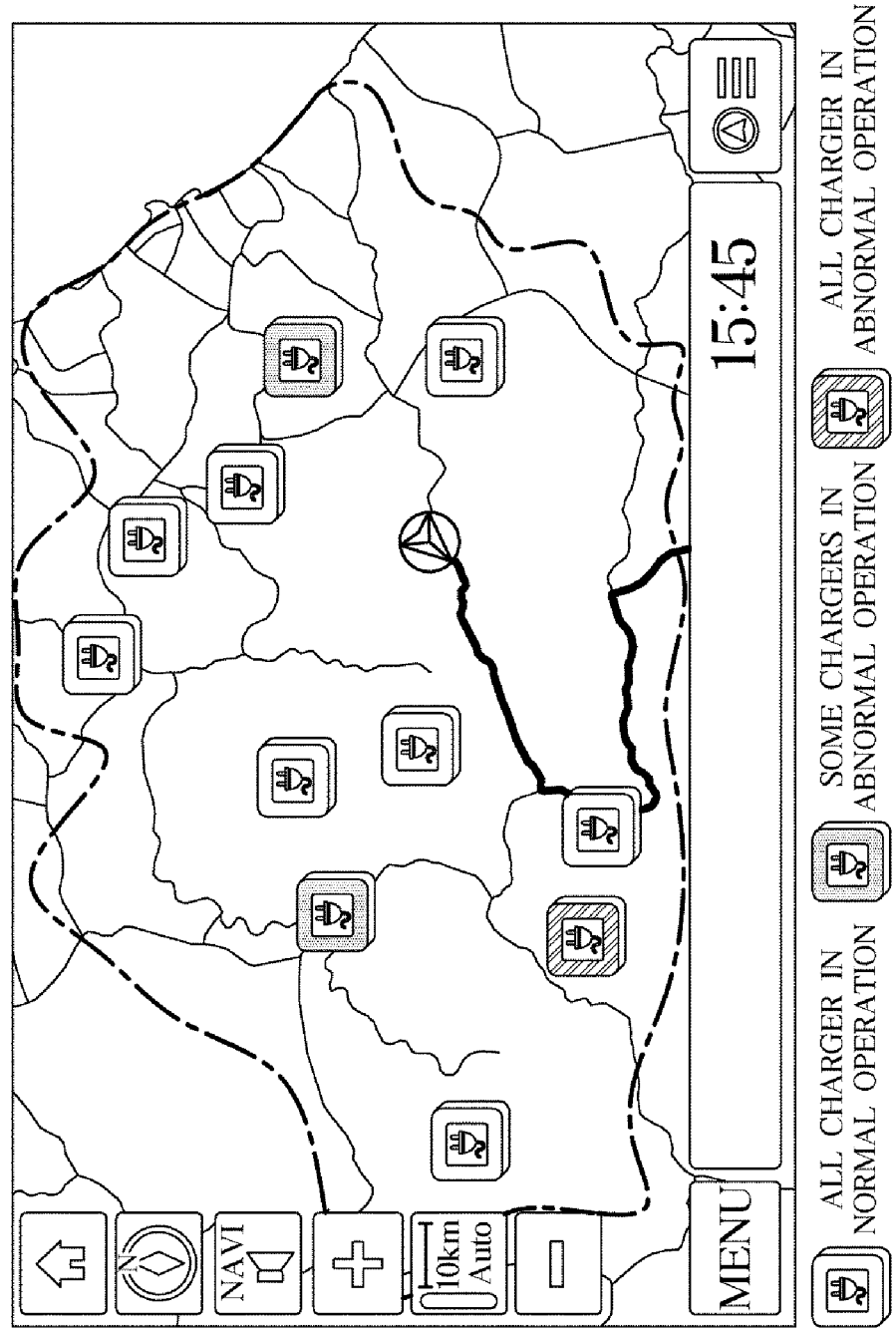
FIG. 4 is a view illustrating an example of a display screen of a charger inquiry result.

FIG. 4 is a view illustrating an example of a display screen of a charger inquiry result.

As illustrated in FIG. 4, the controller 110 may classify each charging station into a 'charging station in which all chargers operate normally', a 'charging station in which some chargers operate abnormally', and a 'charging station in which all chargers operate abnormally', and may display the charging station information to the user (driver) by displaying them on the display 108.

When the controller 110 displays the charging station information on the display 108, the controller 110 may display the position of each charging station on the map, and may display a ratio of the normal charger and the abnormal charger in the form of a percentage or a fraction for each charging station.

In addition, when the user (driver) selects a charging station icon displayed on the display 108, the controller 110 may switch the screen of the display 108 to display the charger information of the corresponding charging station in more detail. In this case, the controller 110 may display whether normal/abnormal determination is made for each charger of the selected charging station and an estimated charging time of each of the corresponding chargers.

The user (driver) may select the charging station (charger) having a desired condition by referring to the charging station information and the charger information displayed on the display 108, and may request a path guidance of the navigation to the selected charging station (charger). For example, the user (driver) may select the charging station closest to a current position of the eco-friendly vehicle 100, even if it has the abnormal charger with a slow charging speed. Conversely, the user (driver) may select the charging station with the normal charger that has a fast charging speed, even if it is not close.

The charging station information and the charger information displayed on the display 108 are transmitted to the national charge management server 150 and accumulated in the database, so that other eco-friendly vehicles may be referred to.

According to the vehicle and the method of controlling the vehicle according to the exemplary embodiments, it is possible to determine whether the charger is normal or abnormal for each charger of the charging station, to guide the path to the charging station based on determination information, and to share the determination information with other users for the convenience of the users.

Figure 5A:
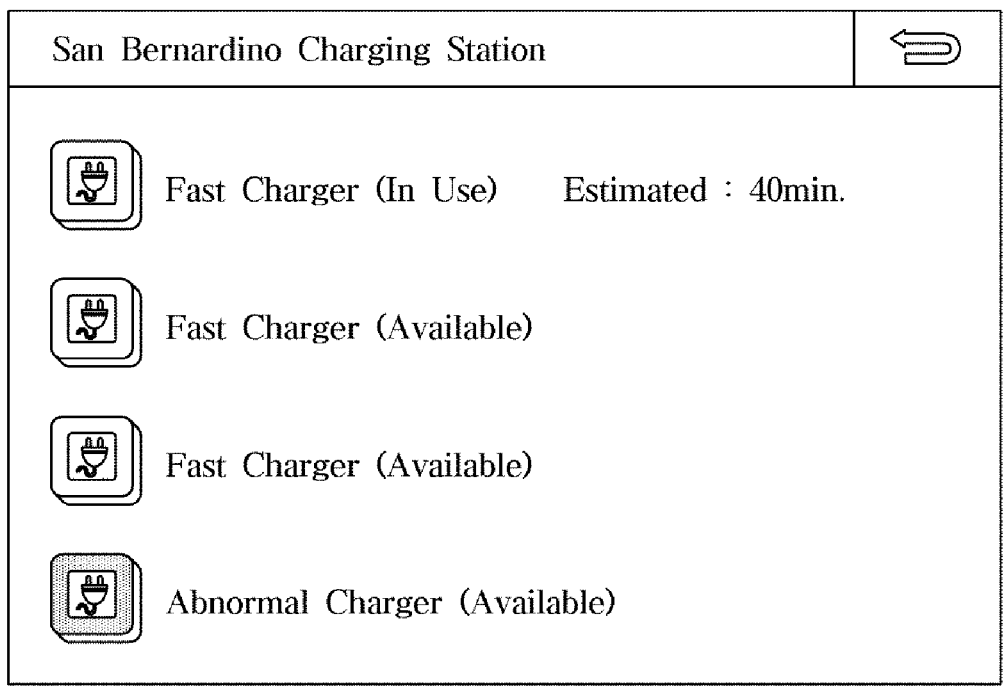
FIGS. 5A and 5B are a view illustrating examples of a screen displayed when charging stations shown in FIG. 4 is selected.
Figure 5B:
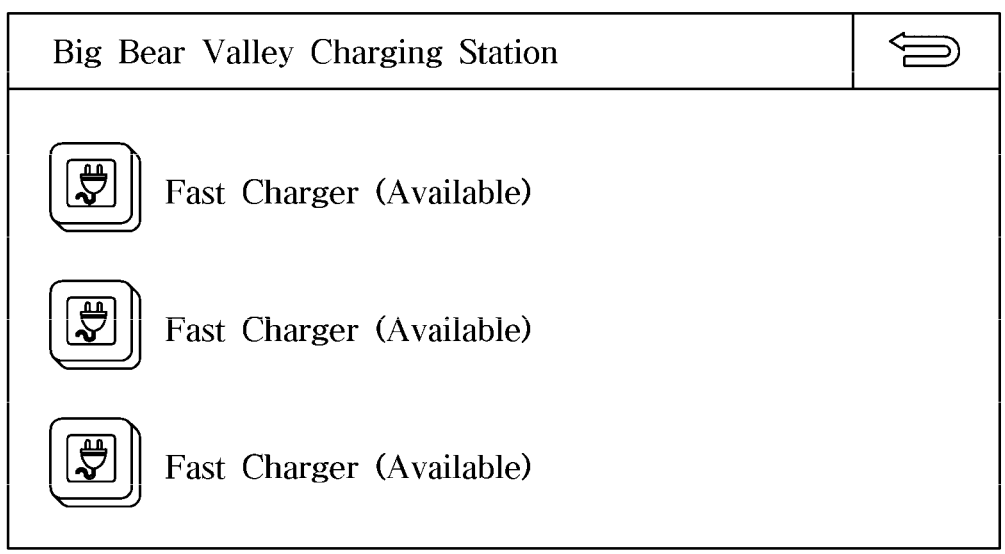

FIGS. 5A and 5B are a view illustrating examples of a screen displayed when charging stations shown in FIG. 4 is selected. FIG. 5A is a screen illustrating charger information of a 'charging station in which all chargers operate normally'. FIG. 5B is a screen illustrating charger information of a 'charging station in which some chargers operate abnormally'.

The disclosed embodiments is merely illustrative of the technical idea, and those skilled in the art will appreciate that various modifications, changes, and substitutions may be made without departing from the essential characteristics thereof. Therefore, the exemplary embodiments disclosed above and the accompanying drawings are not intended to limit the technical idea, but to describe the technical spirit, and the scope of the technical idea is not limited by the embodiments and the accompanying drawings. The scope of protection shall be interpreted by the following claims, and all technical ideas within the scope of equivalent shall be interpreted as being included in the scope of rights.

The invention claimed is:

1. A method of controlling a vehicle comprising:
obtaining, by a receiver, information of a charger, information of a charging vehicle, and information of charging history of the charger and the charging vehicle;
calculating, by a calculator, an expected output and an actual output of the charger based on the obtained information;
classifying, by a controller, the charger as an abnormal charger when the actual output of the charger is smaller than the expected output of the charger; and
transmitting information of the abnormal charger to a remote server for sharing,
wherein the expected output of the charger is determined based on a value indicating a relationship between a battery cell voltage of the charging vehicle and charging current for each battery temperature, an expected charging time through the charger, and a rated charging capacity of the charger; and
wherein the actual output of the charger is determined based on at least one of an actual charging current applied to the vehicle, the actual charging time in the vehicle, an actual charging capacity of the charger.

2. The method according to claim 1, further comprising:
identifying whether an abnormal charging is the abnormal charging due to a vehicle problem;
classifying chargers that are abnormally charged due to the vehicle problem as normal chargers; and
excluding chargers classified as normal chargers from a list of chargers classified as abnormal chargers.

3. The method according to claim 2, wherein the identifying of whether the abnormal charging is the abnormal charging due to the vehicle problem comprises:
determining that the cause of the abnormal charging of the charger is due to a problem of the charging vehicle when power input from the charging vehicle is smaller than the power output from the charger.

4. The method according to claim 2, wherein the identifying of whether the abnormal charging is the abnormal charging due to the vehicle problem comprises:
determining that the cause of the abnormal charging of the charger is due to a problem of the charging vehicle when a current command generated based on information of the charger and the charging vehicle does not correspond to a content of the information.

5. The method according to claim 2, wherein the identifying of whether the abnormal charging is the abnormal charging due to the vehicle problem comprises:
determining that the cause of the abnormal charging of the charger is due to a problem of the charging vehicle when a charging time is prolonged due to an abnormal fastening of a charging cable in the charging vehicle.

6. The method according to claim 2, wherein the identifying of whether the abnormal charging is the abnormal charging due to the vehicle problem comprises:
determining that the cause of abnormal charging of the charger is due to a problem of the charging vehicle when an amount of charging current and a charging time are abnormal due to a battery failure of the charging vehicle.

7. The method according to claim 1, further comprising:
displaying information of the abnormal charger on a map of a display; and
guiding a path to a position of the charger selected by a user.

8. A vehicle comprising:
a receiver configured to receive information of a charger, information of a charging vehicle, and information of charging history of the charger and the charging vehicle;
a calculator configured to calculate an expected output and an actual output of the charger based on the obtained information;
a controller configured to classify the charger as an abnormal charger when the actual output of the charger is smaller than the expected output of the charger; and
a transmitter configured to transmit information of the abnormal charger to a remote server for sharing,
wherein the calculator is configured to determine the expected output of the charger based on a value indicating a relationship between a battery cell voltage of the charging vehicle and charging current for each battery temperature, an expected charging time through the charger, and a rated charging capacity of the charger, and to determine the actual output of the charger based on at least one of an actual charging current applied to the vehicle, the actual charging time in the vehicle, an actual charging capacity of the charger.

9. The vehicle according to claim 8, wherein the controller is configured to identify whether an abnormal charging is the abnormal charging due to a vehicle problem, to classify chargers that are abnormally charged due to the vehicle problem as normal chargers, and to exclude chargers classified as normal chargers from a list of chargers classified as abnormal chargers.

10. The vehicle according to claim 9, wherein the controller is configured to determine that the cause of the abnormal charging of the charger is due to a problem of the charging vehicle when power input from the charging vehicle is smaller than the power output from the charger.

11. The vehicle according to claim 9, wherein the controller is configured to determine that the cause of the abnormal charging of the charger is due to a problem of the charging vehicle when a current command generated based on information of the charger and the charging vehicle does not correspond to a content of the information.

12. The vehicle according to claim 9, wherein the controller is configured to determine that the cause of the abnormal charging of the charger is due to a problem of the charging vehicle when a charging time is prolonged due to an abnormal fastening of a charging cable in the charging vehicle.

13. The vehicle according to claim 9, wherein the controller is configured to determine that the cause of abnormal charging of the charger is due to a problem of the charging vehicle when an amount of charging current and a charging time are abnormal due to a battery failure of the charging vehicle.

14. The vehicle according to claim 8, further comprising:
a display configured to display information of the abnormal charger on a map of a display, and to guide a path to a position of the charger selected by a user.

* * * * *